United States Patent
Eisaman

(10) Patent No.: US 9,914,644 B1
(45) Date of Patent: Mar. 13, 2018

(54) ENERGY EFFICIENT METHOD FOR STRIPPING CO$_2$ FROM SEAWATER

(71) Applicant: X Development LLC, Mountain View, CA (US)

(72) Inventor: Matthew Eisaman, Port Jefferson, NY (US)

(73) Assignee: X Development LLC, Mountain View, CA (US)

( * ) Notice: Subject to any disclaimer, the term of this patent is extended or adjusted under 35 U.S.C. 154(b) by 170 days.

(21) Appl. No.: 14/736,847

(22) Filed: Jun. 11, 2015

(51) Int. Cl.
| | |
|---|---|
| *C01B 31/20* | (2006.01) |
| *B01D 19/00* | (2006.01) |
| *C02F 1/469* | (2006.01) |
| *C02F 1/20* | (2006.01) |
| *B01D 61/42* | (2006.01) |
| *C02F 101/10* | (2006.01) |
| *C02F 103/08* | (2006.01) |

(52) U.S. Cl.
CPC .......... *C01B 31/20* (2013.01); *B01D 19/0068* (2013.01); *B01D 19/0084* (2013.01); *B01D 61/422* (2013.01); *C02F 1/20* (2013.01); *C02F 1/4693* (2013.01); *B01D 2311/12* (2013.01); *C02F 2101/10* (2013.01); *C02F 2103/08* (2013.01); *C02F 2201/46* (2013.01)

(58) Field of Classification Search
CPC ................ C01B 31/20; B01D 19/0068; B01D 19/0084; B01D 61/422; B01D 2311/12; C02F 1/20; C02F 1/4693; C02F 2101/10; C02F 2103/08; C02F 2201/46
USPC ........................................................ 423/438
See application file for complete search history.

(56) References Cited

U.S. PATENT DOCUMENTS

| | | |
|---|---|---|
| 3,075,828 A | 1/1963 | Kato et al. |
| 4,036,749 A | 7/1977 | Anderson |
| | (Continued) | |

FOREIGN PATENT DOCUMENTS

| | | |
|---|---|---|
| CN | 102936067 A | 2/2013 |
| EP | 1276795 | 3/2006 |
| | (Continued) | |

OTHER PUBLICATIONS

Eisaman, et al., CO2 extraction from seawater using bipolar membrane electrodialysis, Energy Environ. Sci. 2012; 5: 7346-7352.*

(Continued)

*Primary Examiner* — Daniel C McCracken
(74) *Attorney, Agent, or Firm* — Christensen O'Connor Johnson Kindness PLLC

(57) ABSTRACT

A method including increasing modifying a volume of seawater that holds an amount of dissolved inorganic carbon; acidifying the amount of seawater; and collecting an amount of carbon dioxide from the acidified seawater. A system including an electrodialysis unit including an acidified solution compartment, a basified solution compartment, a membrane and an acidified solution output compartment; a vessel coupled to an inlet of the acidified solution compartment and operable to contain a modified volume of seawater therein; and a desorption unit coupled to the acidified compartment output, the desorption unit operable to receive carbon dioxide gas from a solution from the acidified output compartment.

16 Claims, 3 Drawing Sheets

(56) References Cited

U.S. PATENT DOCUMENTS

| | | | |
|---|---|---|---|
| 4,392,959 A | 7/1983 | Coillet | |
| 4,539,091 A * | 9/1985 | Kaneda | B01D 61/44 |
| | | | 126/569 |
| 6,905,606 B1 | 6/2005 | Kikuyama et al. | |
| 7,117,106 B2 | 10/2006 | Rusta-Sallehy et al. | |
| 7,198,722 B2 | 4/2007 | Hussain | |
| 7,655,193 B1 | 2/2010 | Rau et al. | |
| 7,700,214 B1 | 4/2010 | Iyer et al. | |
| 7,906,028 B2 | 3/2011 | Constantz et al. | |
| 7,931,809 B2 | 4/2011 | Constantz et al. | |
| 7,947,239 B2 | 5/2011 | Lackner et al. | |
| 8,227,127 B2 | 7/2012 | Little et al. | |
| 8,313,557 B2 | 11/2012 | Willauer et al. | |
| 8,337,589 B2 | 12/2012 | Wright et al. | |
| 8,685,250 B2 | 4/2014 | Choi et al. | |
| 8,778,156 B2 | 7/2014 | Eisaman et al. | |
| 8,784,632 B2 | 7/2014 | Eisaman et al. | |
| 8,999,171 B2 | 4/2015 | Wallace et al. | |
| 9,227,168 B1 | 1/2016 | DeVaul et al. | |
| 2005/0074657 A1 | 4/2005 | Rusta-Sallehy et al. | |
| 2008/0033338 A1 | 2/2008 | Smith | |
| 2008/0093307 A1 | 4/2008 | Somers et al. | |
| 2009/0001020 A1 | 1/2009 | Constantz et al. | |
| 2010/0028242 A1 | 2/2010 | Willauer et al. | |
| 2010/0233767 A1 | 9/2010 | McMurran | |
| 2010/0288700 A1 | 11/2010 | Lahav et al. | |
| 2011/0056876 A1 | 3/2011 | Ide et al. | |
| 2011/0135551 A1 | 6/2011 | House et al. | |
| 2011/0177550 A1 | 7/2011 | McMurran | |
| 2011/0224578 A1 | 9/2011 | Edman et al. | |
| 2011/0226006 A1 | 9/2011 | Lackner et al. | |
| 2011/0237839 A1 | 9/2011 | Waldstein | |
| 2011/0281959 A1 | 11/2011 | DiMascio et al. | |
| 2012/0211421 A1 | 8/2012 | Self et al. | |
| 2012/0220019 A1 | 8/2012 | Lackner et al. | |
| 2012/0244053 A1 | 9/2012 | Self et al. | |
| 2013/0008792 A1 | 1/2013 | Eisaman et al. | |
| 2013/0034760 A1 | 2/2013 | Otts et al. | |
| 2013/0206605 A1 | 8/2013 | DiMascio et al. | |
| 2013/0281553 A1 | 10/2013 | Kubic et al. | |
| 2013/0343981 A1 | 12/2013 | Wright et al. | |
| 2014/0002788 A1 | 1/2014 | Otts et al. | |
| 2014/0217024 A1 | 8/2014 | Monzyk et al. | |
| 2014/0234735 A1 | 8/2014 | Zhang et al. | |
| 2014/0238869 A1 | 8/2014 | DiMascio et al. | |
| 2014/0272639 A1 | 9/2014 | Zietlow | |
| 2014/0303452 A1 | 10/2014 | Ghaffari | |
| 2014/0322803 A1 | 10/2014 | Constantz et al. | |
| 2014/0338903 A1 | 11/2014 | Mahmoud et al. | |
| 2015/0274536 A1 | 10/2015 | Wright et al. | |
| 2015/0298806 A1 | 10/2015 | Lind et al. | |
| 2016/0082387 A1 | 3/2016 | Constantz et al. | |

FOREIGN PATENT DOCUMENTS

| | | |
|---|---|---|
| EP | 2074066 | 7/2009 |
| EP | 2465600 | 6/2012 |
| EP | 2465601 | 6/2012 |
| EP | 2543427 | 1/2013 |
| WO | WO-9412465 | 6/1994 |
| WO | WO 2010/142943 A2 | 12/2010 |
| WO | WO 2011/090376 A1 | 7/2011 |

OTHER PUBLICATIONS

Willauer, H. D. et al., Extraction of Carbon Dioxide from Seawater by an Electrochemical Acidification Cell. Part 2—Laboratory Scaling Studies, Apr. 2011, 22 pages.

Biorock International Coral Reef Restoration, Biorock International Corporation, 2012, 2 pages.

Rangel C. M. et al., Integrating hydrogen generation and storage in a novel compact electrochemical system based on metal hydrides, Jul. 2008, 5 pages.

U.S. Appl. No. 62/342,061—Method for Efficient CO2 Degasification, filed May 26, 2016, 23 pages.

U.S. Appl. No. 15/165,885—Metal Hydride Electrolysis System, filed May 26, 2016, 21 pages.

U.S. Appl. No. 62/342,065—Chemical Extraction From an Aqueous Solution, filed May 26, 2016, 29 pages.

U.S. Appl. No. 15/165,205—Chemical Extraction From an Aqueous Solution and Power Generator Cooling, filed May 26, 2016, 30 pagse.

U.S. Appl. No. 15/165,260—Building Materials From an Aqueous Solution, filed May 26, 2016, 29 pages.

U.S. Appl. No. 15/165,311—Enhanced Hydrocarbon Extraction, filed May 26, 2016, 27 pages.

U.S. Appl. No. 15/165,357—Fuel Synthesis From an Aqueous Solution, filed May 26, 2016, 31 pages.

U.S. Appl. No. 14/750,800—CO2 Sequestration Via Desalination, filed Jun. 25, 2015, 16 pages.

U.S. Appl. No. 15/165,867—Method for Feeding Algae Using Reclaimed CO2, filed May 26, 2016, 19 pages.

Eisaman, Matthew D., et al., "CO2 extraction from seawater using bipolar membrane electrodialysis", Electronic Supplementary Material (ESI) for Environmental Science, The Royal Society of Chemistry, (2012), 1-4.

Eisaman, Matthew D., et al., "CO2 separation using bipolar membrane electrodialysis", Energy & Environmental Science, vol. 4, No. 4, (Apr. 2011), 1319-1328.

U.S. Appl. No. 14/971,122—Electrodialytic CO2 Purification and Stripping, filed Dec. 16, 2015, 16 pages.

\* cited by examiner

ENERGY EFFICIENT METHOD FOR STRIPPING CO$_2$ FROM SEAWATER

FIELD

This disclosure relates generally to the field of carbon dioxide separation and collection.

BACKGROUND

The separation of carbon dioxide (CO$_2$) from a mixed-gas source may be accomplished by a capture and regeneration process. More specifically, the process generally includes a selective capture of CO$_2$, by, for example, contacting a mixed-gas source with a solid or liquid adsorber or absorber followed by a generation or desorption of CO$_2$ from the adsorber or absorber. One technique describes the use of bipolar membrane electrodialysis for CO$_2$ removal from potassium carbonate and bicarbonate solutions.

For capture/regeneration systems, a volume of gas that is processed is generally inversely related to a concentration of CO$_2$ in the mixed-gas source, adding significant challenges to the separation of CO$_2$ from dilute sources such as the atmosphere. CO$_2$ in the atmosphere, however, establishes equilibrium with the total dissolved inorganic carbon in the oceans, which is largely in the form of bicarbonate ions (HCO$_3^-$) at an ocean pH of 8.1-8.3. Therefore, a method for extracting CO$_2$ from the ocean would effectively enable the separation of CO$_2$ from atmosphere without the need to process large volumes of air.

SUMMARY

In one embodiment, a method of separating carbon dioxide from seawater is described, the method including modifying a volume of seawater that holds a given amount (e.g., a mass) of dissolved inorganic carbon by, for example, increasing a concentration of dissolved inorganic carbon in the seawater and then acidifying the modified seawater followed by collecting an amount of carbon dioxide from the acidified seawater. Dissolved inorganic carbon or "DIC" as used herein includes dissolved CO$_2$ gas, bicarbonate ions and carbonate ions. One way the concentration of DIC in an amount of seawater is concentrated is by evaporating water molecules from the seawater (e.g., heating the seawater). By increasing a concentration of DIC in an amount of seawater, when such bicarbonate ions and carbonate ions react with hydrogen ion (upon acidification of the seawater), a partial pressure of carbon dioxide in the acidified seawater is increased. Increasing the partial pressure of carbon dioxide in seawater means less energy is required to remove (strip) the carbon dioxide from the acidified seawater.

In another embodiment, a system is described. A system includes an electrodialysis unit comprising an acidified solution compartment, a basified solution compartment, a membrane and an acidified solution output compartment and a vessel coupled to an inlet of the acidified solution compartment and operable to contain a modified volume of seawater therein. A suitable vessel is, for example, a solar pond where an amount (e.g., a volume) of seawater may be modified by evaporation of water molecules contained therein. The system also includes a desorption unit coupled to the acidified compartment output, the desorption unit operable to receive carbon dioxide gas from a solution from the acidified output compartment. In one embodiment, the desorption unit is a vessel that may receive carbon dioxide gas by such gas escaping from a solution from the acidified solution compartment of the electrodialysis in the absence of a vacuum.

DETAILED DESCRIPTION

Figure 1:
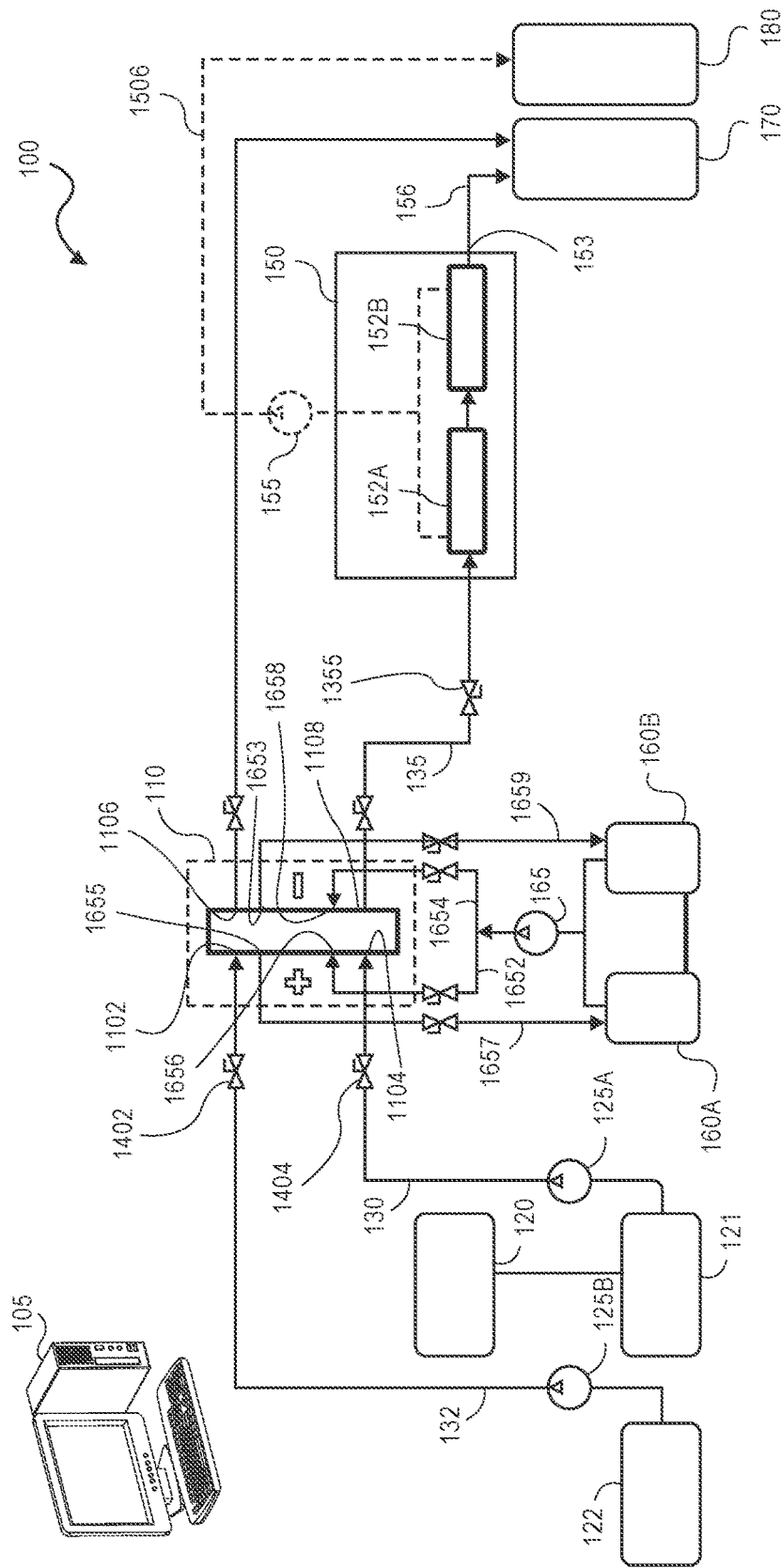
FIG. 1 shows a schematic side view of a system operable to extract or otherwise remove carbon dioxide (CO$_2$) from seawater.

FIG. 1 presents a schematic representation of a system operable to extract or otherwise remove CO$_2$ from seawater. Referring to FIG. 1, system 100 includes electrodialysis unit 110, representatively a bipolar membrane electrodialysis (BPMED) unit that, in one embodiment, is a multi-cell membrane stack that in the presence of an electric field converts seawater (a salt solution) into two separate output streams: acidified seawater and basified seawater. The reactions indicative of CO$_2$ formation are:

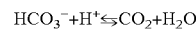

$$HCO_3^- + H^+ \leftrightarrows CO_2 + H_2O$$

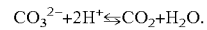

$$CO_3^{2-} + 2H^+ \leftrightarrows CO_2 + H_2O.$$

CO$_2$ gas is then collected from the portion (volume) of the acidified seawater solution output from BPMED unit 110. In one embodiment, the acidified seawater solution is subjected to a desorption process wherein, for example, CO$_2$ and oxygen (O$_2$) and nitrogen (N$_2$) gases are vacuum stripped from the solution. To separate CO$_2$ from O$_2$ and N$_2$, the gas mixture can be introduced into a solution including hydroxide ions (OH$^-$). The CO$_2$ selectively reacts with hydroxide ions in the solution to the exclusion of N$_2$ and O$_2$ to form bicarbonate (HCO$_3^-$) and/or carbonate (CO$_3^{2-}$) ions in an acidified solution. The solution containing HCO$_3^-$ and/or CO$_3^{2-}$ may be passed through a BPMED unit to acidify and desorb CO$_2$ that is then collected. In another embodiment, O$_2$ and N$_2$ are vacuum stripped from the modified seawater solution prior to acidification.

Referring to FIG. 1, system 100 includes vessel 120 having a volume that is operable to contain a volume of seawater solution (on the order of pH 8). Common seawater introduced into vessel 120 includes an amount (e.g., a mass) of DIC (e.g., dissolved CO$_2$ gas, bicarbonate ions (HCO$_3^-$) and/or carbonate ions (CO$_3^{2-}$)) at a concentration generally on the order of 2.5 millimolar (mM). When the concentration of DIC in common seawater is converted to carbon dioxide in an electrodialysis unit such as BPMED unit 110 (e.g., via an acid addition reaction), a partial pressure of CO$_2$ in the thus created acidified seawater is on the order of 0.08 atmospheres (atm) ("common acidified seawater"). Generally speaking, to thereafter separate CO$_2$ at a partial pressure on the order of 0.08 atmospheres from the common acidified seawater requires a reduced pressure above the solution (i.e., a pressure less than 0.08 atmospheres). Creating a pressure less than 0.08 atmospheres (i.e., creating a vacuum environment) above the solution requires energy, such as energy to power a vacuum stripper.

In one embodiment, to reduce the energy required to remove or strip CO$_2$ from seawater, once in vessel 120, a volume of common seawater is modified to increase a concentration of DIC prior to an acid addition reaction to produce $CO_2$ ("modified seawater"). In one embodiment, once in vessel 120, a concentration of DIC in the common seawater is increased by evaporating a portion of the water molecules therein. One technique for evaporating water molecules in the common seawater is by exposing the common seawater in vessel 120 to heat. To achieve energy savings, in one embodiment, the common seawater is exposed to low grade heat. An example of an implementation of low grade heat is where vessel 120 is a solar pond (e.g., a pond with a large surface area and shallow (low) depth). The heat for evaporation is provided by sunlight (solar thermal energy).

In one embodiment, a concentration of DIC in an amount of common seawater is increased by, for example, the evaporation of water molecules to a concentration such that, following an acid addition reaction to produce $CO_2$, a partial pressure of $CO_2$ in the acidified seawater is greater than 0.08 atmospheres and, in another embodiment, is greater than one (1) atmosphere. A partial pressure of $CO_2$ in acidified seawater greater than 1 atmosphere will allow for the stripping or release of $CO_2$ from acidified seawater in the absence of a vacuum above the acidified seawater and the associated energy requirement to create the vacuum.

Referring to FIG. 1, modified seawater from vessel 120, such as a solar pond, in one embodiment, is optionally transferred to cooling vessel 121 where the modified seawater is cooled by, for example, ambient cooling. Representatively, cooling vessel 121 is a vessel that does not promote collection of solar thermal energy. Therefore, the modified seawater is pumped using pump 125A through conduit 130 toward BPMED unit 110 to feed acid input 1104 of BPMED unit 110. Separately, system 100 includes vessel 122 having contained therein, for example, an amount (e.g., a volume) of common seawater that is not modified to increase a concentration of DIC. Common seawater from vessel 122 is pumped using pump 125B through conduit 132 toward BPMED unit 110 to feed base input 1102 of BPMED unit 110. Base input 1102 feeds basified solution compartments within BPMED unit 110 and acid input 1104 feeds acidified solution compartments within the unit. In one embodiment, system 100 includes valve 1402 in conduit 132 to control a flow of common seawater from input tank 122 into base input 1102 and valve 1404 in conduit 130 to control a flow of modified seawater from input tank 122 into acid input 1104.

Figure 2:
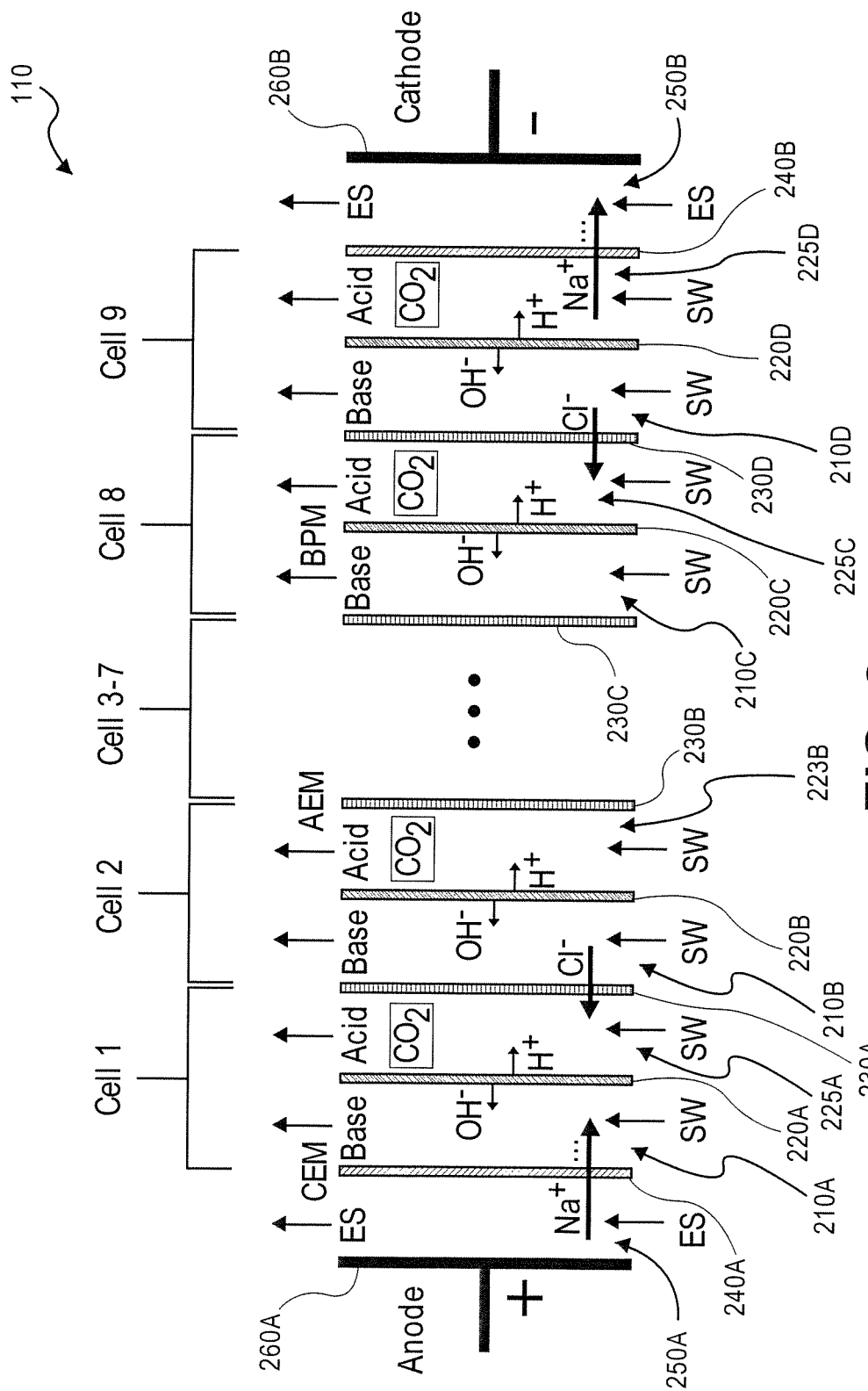
FIG. 2 shows a cross-sectional side view of an embodiment of a bipolar membrane electrodialysis unit in the system of FIG. 1.

FIG. 2 shows a cross-section of an embodiment of BPMED unit 110. In this embodiment, the unit representatively consists of nine cells in series, with each cell consisting of: a basified solution compartment (compartments 210A, 210B, 210C and 210D illustrated); a bipolar membrane (BPM) such as Neosepta BP-1E, commercially available from Ameridia Corp. (BPM 220A, 220B, 220C and 220D illustrated); an acidified solution compartment; and an anion exchange membrane (AEM), such as Neosepta ACS, commercially available from Ameridia Corp. (AEM 230A, 230B, 230C and 230D illustrated). At each end of the membrane stack, a cation exchange membrane (CEM) such as AEM, Neosepta CMX-S, commercially available from Ameridia Corp. is used to separate the membrane stack from electrode compartment (CEM 240A and CEM 240B are illustrated separating the membrane stack from electrode compartment 250A and electrode compartment 250B, respectively). Broadly speaking, under an applied voltage, water dissociation inside the BPM and the ion-selective membranes comprising a BPM will result in the transport of H ions from one side of a BPM, and $OH^-$ ions from the opposite side. AEMs/CEMs, as their names suggest, allow the transport of negatively/positively charged ions through the membrane. The properties of these membranes such as electrical resistance, burst strength, and thickness are provided by the manufacturer (e.g., Neosepta ACS and CMX-S are monovalent-anion and monovalent-cation permselective membranes, respectively). In one embodiment, BPMED unit 110 includes electrodes 260A and 260B of, for example, titanium with an iridium-ruthenium based coating manufactured by De Nora Tech Inc. The solution compartments between adjacent membranes (basified solution compartments 210A-210D and acidified solution compartments 225A-225D) are filled with polyethylene mesh spacers (e.g., 762 μm thick polyethylene mesh spacers), and these compartments are sealed against leaks using axial pressure and 794 mm thick EPDM rubber gaskets. Each membrane has an active area of 180 $cm^2$.

In addition to the introducing seawater to BPMED unit 110, in system 100, an electrode solution is pumped through anode and cathode compartments of the BPMED unit, respectively. In one embodiment, a suitable electrode solution is a 0.1 molar $H_2SO_4$/0.25 molar $Na_2SO_4$ solution. FIG. 1 shows electrode solution tanks 160A and 160B each having a volume operable to contain an electrode solution or solutions. The electrode solution is pumped by pump 165 into conduit 1652 and conduit 1654 that are connected to electrode solution input port 1656 and electrode solution input port 1658 of BPMED unit 110 associated with an anode and a cathode, respectively. The electrode solution flows through an anode compartment and a cathode compartment of BPMED unit 110 and exits BPMED unit 110 through electrode solution output port 1655 and electrode solution output port 1653, respectively. The electrode solution is returned to electrode solution tank 160A and electrode solution tank 160B through conduit 1657 and conduit 1659, respectively. Any gases present in the anode and cathode output electrode solutions may be separately vented before recombining the solutions in the electrode solution tank.

In one embodiment, the modified seawater and common seawater are pumped into the respective acid input 1104 and base input 1102 of BPMED unit 110 and the electrode solution is pumped through anode and cathode compartments of the unit. A power supply is connected to electrodes of BPMED unit 110 and a desired current is introduced across the membrane stack to promote ion transport to produce an acidified seawater solution and a basified seawater solution.

In the embodiment shown in FIG. 1, BPMED unit 110 includes base solution output 1106 through which a basified solution is discharged and acid solution output 1108 through which an acidified solution is discharged (acidified seawater solution). The acidified solution contains dissolved $CO_2$ and may contain $N_2$ and $O_2$. The acidified solution discharged from acid solution output 1108 is delivered to conduit 135 connected to the output to feed $CO_2$ desorption unit 150.

To extract or otherwise remove $CO_2$ from seawater, in one embodiment, the acidified seawater from BPMED unit 110 is directed to desorption unit 150. In one embodiment, where a concentration of modified seawater fed to BPMED unit is such that a partial pressure of $CO_2$ in the acidified seawater discharged through output 1108 is greater than 1 atm, desorption unit 150 is a vessel or tank that is evacuated of air prior to receiving the acidified seawater. Upon introduction to desorption unit 150, $CO_2$ in the acidified seawater will escape from solution into the tank by way of escaping to a lower pressure. The solution in desorption unit is released at output 153 into waste tank 170 by way of conduit 156. The $CO_2$ released from solution is captured in desorption unit 150.

In another embodiment, a partial pressure in the acidified seawater is 1 atm or less (but greater than 0.08 atm). In this embodiment, stripping of $CO_2$ from the acidified seawater is necessary though at a lower energy requirement than prior art systems. Representatively, desorption unit 150 includes one or more membrane contactors (contactor 152A and contactor 152B illustrated). A suitable membrane contactor is a Liqui-Cel®X50 fibre type 2.5×8 membrane contactor commercially available from Membrana of Charlotte, N.C. Each membrane contactor has an inlet and an outlet for vacuum and an inlet and an outlet for the liquid solution to allow vacuum stripping of $CO_2$ from the acidified seawater solution. FIG. 1 shows vacuum pump 155 to pull a vacuum and remove $CO_2$ in gaseous form from the acidified seawater. $CO_2$ gas is removed from (exits) desorption unit 150 and transferred through conduit 175 to collection tank 180. FIG. 1 also shows the basified output solution from BPMED unit 110 directed to waste tank 170.

In one embodiment, an operation of system 100 described above may be controlled by a controller. FIG. 1 shows controller 105 that may be connected to through wires or wirelessly to various units of system 100 such as pump 125A to transfer modified seawater into BPMED unit 110 from input vessel 120; pump 125B to transfer a solution from vessel 122 into BPMED unit 110; pump 165 to transfer electrode solution into BPMED unit 110 from electrode solution tanks 160A and 160B; and optional vacuum pump 155 to extract $CO_2$ gas from desorption unit 150. Variable pumps (IDNM 3534 motor and VS1MX Microdrive, Baldor Electric Company) can be used to control the flow rate and pressure of modified seawater and electrode solution. In addition to the described pumps, in one embodiment, controller 105 is connected to various valves to control the respective flow of liquids and gases through the system. Representatively, controller 105 is connected to valves 1402 and 1404 to control the flow of a solution from input tank 122 into base input 1102 of BPMED 110 and the flow of modified seawater from input tank 120 into acid input 1104 of BPMED unit 110. Other valves that are representatively controlled by controller 105 include valves positioned in conduit at the output side of BPMED unit 110 including, but not limited to, valve 1355 to control the flow of the acidified seawater output from BPMED unit 110 to desorption unit 150.

Figure 3:
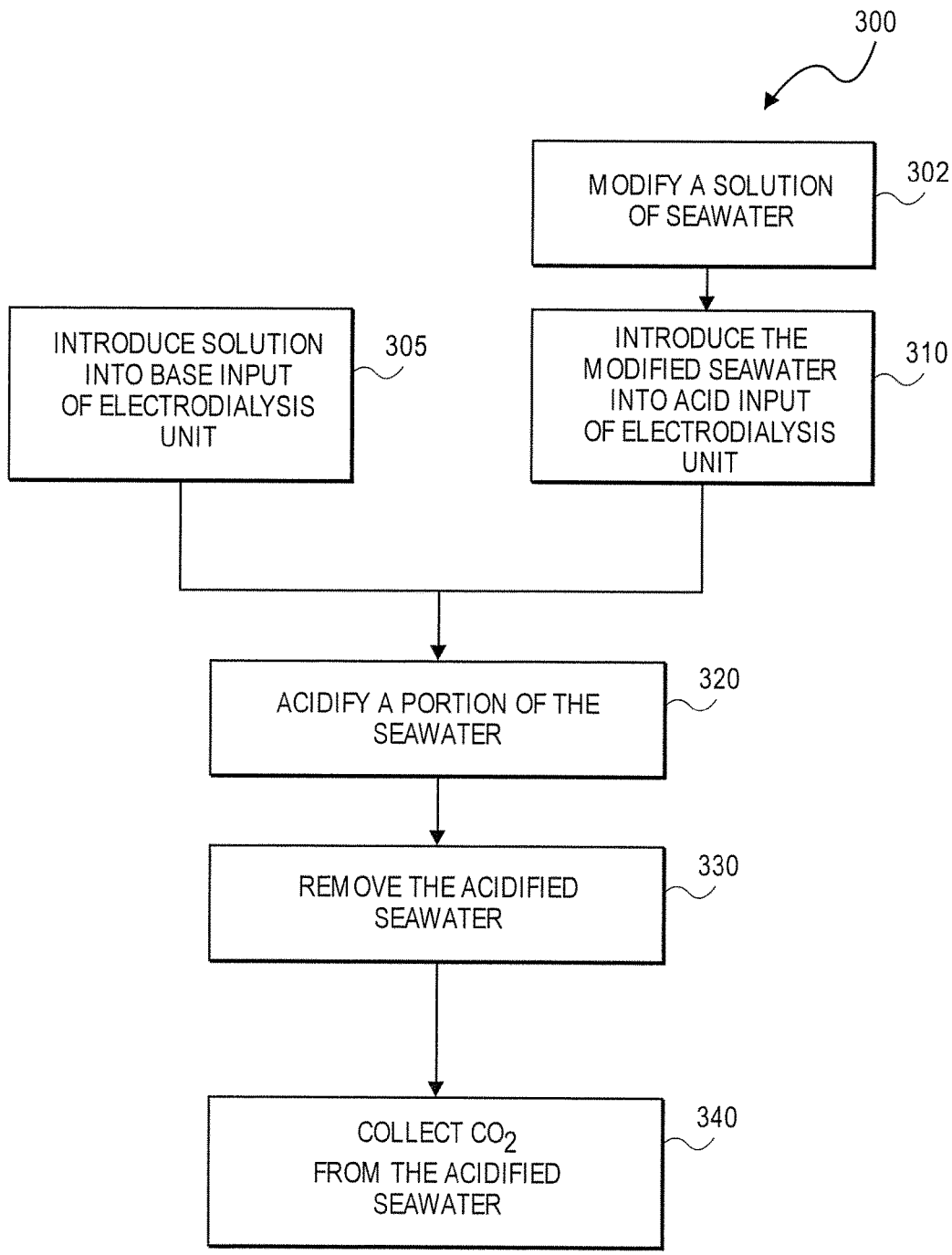
FIG. 3 presents a flow chart of a representative method of extracting CO$_2$ from seawater.

In one embodiment, controller 105 contains machine-readable program instructions as a form of non-transitory media. In one embodiment, the program instructions perform a method of extracting and collecting $CO_2$ from seawater. FIG. 3 presents a flow chart of a representative method. Referring to FIG. 3, method 300 describes modifying a volume of seawater (block 302). In one embodiment, a volume of seawater may be modified to increase a concentration of DIC. Method 300 also describes introducing the modified seawater into an acid input of an electrodialysis unit such as BPMED unit 110 in FIG. 1 (block 310) and introducing a solution such as unmodified seawater into a base input of the unit. The program instructions associated with controller 105 direct, for example, the opening of valves 1402 and 1403 and the operation of pump 125A to transfer the modified seawater from input tank 120 and pump 125B to transfer a solution from tank 122. The program instructions similarly control the introduction of electrode solution into the electrodialysis unit and a control of current through the unit to create an electrical potential across the membrane stack and acidify seawater introduced into an acidified solution compartment of the electrodialysis unit (seawater introduced into the acid input) (block 320). The acidified seawater being removed from the electrodialysis unit is directed to a desorption unit (e.g., desorption unit 150, FIG. 1) where $CO_2$ is separated and subsequently collected.

In one embodiment, controller 105 also regulates and monitors the system. Such regulation and monitoring may be accomplished by a number of sensors throughout the system that either send signals to controller 105 or are queried by controller 105. For example, with reference to BPMED unit 110, such monitors may include one or more pH gauges to monitor a pH within the units as well as pressure sensors to monitor. A pressure among the compartments in BPMED unit 110 is to avoid mechanical damage to the BPMED membrane stack and the unwanted mixing of different solution streams within the membrane stack. Other monitors include one or pressure monitors associated with BPMED unit 110 to minimize the expulsion of gases within the unit.

The above-described system may be used to collect $CO_2$ from seawater or any other liquid source. Such collection may serve to reduce a concentration of $CO_2$ in the atmosphere and also provide a source of $CO_2$ may be used in various industries, including, but not limited to, as a fuel source.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:
1. A method comprising:
  increasing a concentration of dissolved inorganic carbon in a volume of seawater to produce modified seawater;

acidifying the modified seawater by flowing the modified seawater into an acidified solution compartment in an electrodialysis unit;

flowing the seawater from a second volume of the seawater into a basified solution compartment in the electrodialysis unit at the same time as flowing the modified seawater into the acidified solution compartment, wherein the second volume of the seawater is unmodified; and collecting an amount of carbon dioxide from the acidified seawater.

2. The method of claim 1, wherein increasing a concentration of dissolved inorganic carbon in the seawater comprises heating the seawater.

3. The method of claim 2, wherein heating the seawater comprises exposing the seawater to low grade heat.

4. The method of claim 2, wherein heating the seawater comprises exposing the seawater to solar thermal energy.

5. The method of claim 1, wherein prior to acidifying the modified seawater, the method comprises cooling the modified seawater.

6. The method of claim 1, wherein after acidifying the modified seawater, the method comprises transferring the acidified seawater to a tank, and collecting an amount of carbon dioxide from the acidified seawater comprises collecting the carbon dioxide that escapes from the acidified seawater in the tank.

7. The method of claim 5, wherein prior to transferring the acidified seawater to the tank, the method comprises evacuating the tank of air.

8. The method of claim 1, wherein collecting an amount of carbon dioxide comprises vacuum stripping the carbon dioxide from the acidified seawater.

9. A method comprising:

removing a portion of water molecules from a volume of seawater comprising an amount of dissolved inorganic carbon to form modified seawater;

after removing a portion of water molecules from the volume of seawater, introducing the modified seawater into an acidified solution compartment in an electrodialysis unit;

acidifying the seawater in the acidified solution compartment;

at the same time as introducing the modified seawater into the acidified solution compartment, introducing the seawater from a second volume of the seawater into a basified solution compartment in the electrodialysis unit, wherein the second volume of the seawater is unmodified; and collecting an amount of carbon dioxide from the acidified seawater.

10. The method of claim 9, wherein removing a portion of water molecules from a volume of seawater comprises heating the seawater.

11. The method of claim 10, wherein heating the seawater comprises exposing the seawater to low grade heat.

12. The method of claim 10, wherein heating the seawater comprises exposing the seawater to solar thermal energy.

13. The method of claim 10, wherein prior to introducing the seawater into an electrodialysis unit, the method comprises cooling the modified seawater.

14. The method of claim 9, wherein after acidifying the modified seawater, the method comprises transferring the acidified seawater to a tank, and collecting an amount of carbon dioxide from the acidified seawater comprises collecting the carbon dioxide that escapes from the acidified seawater in the tank.

15. The method of claim 14, wherein prior to transferring the acidified seawater to the tank, the method comprises evacuating the tank of air.

16. The method of claim 9, wherein collecting an amount of carbon dioxide comprises vacuum stripping the carbon dioxide from the acidified seawater.

* * * * *